United States Patent [19]
Tanaka et al.

[11] Patent Number: 6,043,581
[45] Date of Patent: Mar. 28, 2000

[54] DYNAMO-ELECTRIC MACHINE AND METHOD OF MANUFACTURE THEREFOR

[75] Inventors: Toshinori Tanaka; Harumi Inoue; Mitsuyuki Tsumura; Akihiro Daikoku; Kazuhisa Takashima; Kyouhei Yamamoto, all of Tokyo, Japan

[73] Assignee: Mitsubishi Denki Kabushiki Kaisha, Tokyo, Japan

[21] Appl. No.: 09/271,314

[22] Filed: Mar. 18, 1999

[30] Foreign Application Priority Data

Aug. 7, 1998 [JP] Japan .................................. 10-224546

[51] Int. Cl.$^7$ ............................. H02K 3/16; H02K 23/22; H02K 27/22

[52] U.S. Cl. ...................... 310/197; 310/180; 310/234; 310/225; 310/195; 29/597

[58] Field of Search .................................. 310/179, 180, 310/42, 234, 264, 197, 195, 224, 225; 242/1.1 R; 29/597

[56] References Cited

U.S. PATENT DOCUMENTS

| | | | |
|---|---|---|---|
| 3,913,220 | 10/1975 | Miller | 29/597 |
| 4,291,456 | 9/1981 | Peck, Jr. et al. | 29/597 |
| 4,857,790 | 8/1989 | Kamiyama et al. | 310/234 |
| 5,044,065 | 9/1991 | Dyke et al. | 29/597 |
| 5,727,307 | 3/1998 | Gstohl et al. | 29/597 |
| 5,736,917 | 4/1998 | Kawano et al. | 336/90 |

*Primary Examiner*—Clayton E LaBalle
*Attorney, Agent, or Firm*—Sughrue, Mion, Zinn, Macpeak & Seas, PLLC

[57] ABSTRACT

A dynamo-electric machine comprises: a shaft; a core secured to the shaft having slots formed therein extending in the axial direction; a winding composed of a wire or wires wound by a lap winding method through the slots; a commutator having commutator segments being disposed at one end of the core and secured to the shaft; and equalizing connectors electrically connecting commutator segments which should have the same electric potential; wherein one end portion of each of the equalizing connectors is connected to one of the commutator segments and the other end portion of each of the equalizing connectors passes through the slots and is connected to the other of the commutator segments.

13 Claims, 12 Drawing Sheets

DYNAMO-ELECTRIC MACHINE AND METHOD OF MANUFACTURE THEREFOR

BACKGROUND OF THE INVENTION

1. Field of the Invention

The present invention relates to a dynamo-electric machine which comprises equalizing connectors electrically connecting commutator segments which should have the same electric potential, and to a method of manufacture therefor.

2. Description of the Related Art

Figure 14:
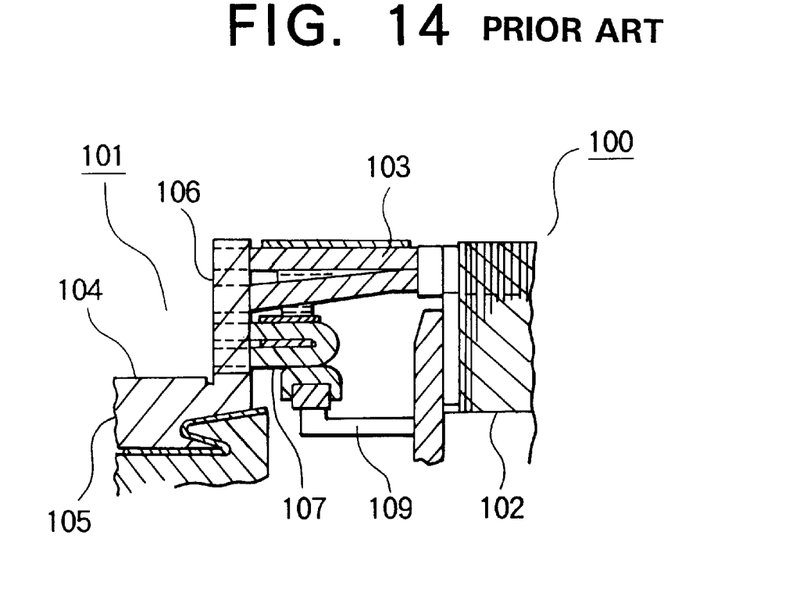
FIG. 14 is a partial cross-section of a conventional electric motor.

FIG. 14 is a partial cross-section of an electric motor which is a conventional dynamo-electric machine. In this electric motor, a commutator assembly 101 is disposed in the vicinity of an armature 100.

The armature 100 comprises: a core 102 having slots extending in the axial direction; and a winding 103 composed of a wire or wires wound by a lap winding method through the slots.

Figure 15:
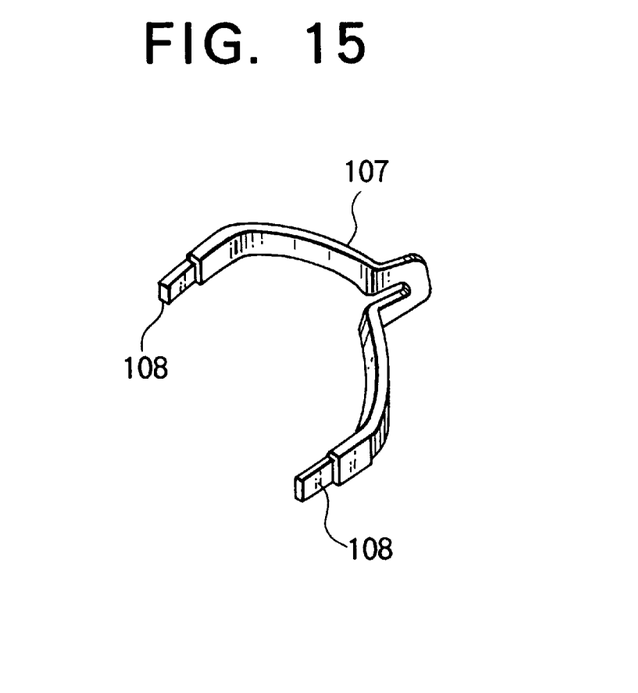
FIG. 15 is a perspective view of the equalizing connector in FIG. 14.

The commutator assembly comprises: a commutator 105 having commutator segments 104 arranged around its circumference and risers 106 electrically connected to the winding 103; brushes (not shown) which contact the commutator segments 104; and equalizing connectors 107 electrically connecting commutator segments which should have the same electric potential. End portions 108 of the equalizing connectors 107 shown in FIG. 15 are secured to the risers 106 by brazing, etc. The equalizing connectors 107 are secured and supported by a securing member 109, enabling the equalizing connectors 107 to withstand centrifugal force.

In the above 4-pole lap-wound electric motor, an electric current is supplied to the winding 103 from outside by means of the brushes contacting the commutator segments 104, whereby the armature 100, equalizing connectors 107, and the commutator 105, which are all secured to a rotating shaft (not shown), rotate together with the rotating shaft due to electromagnetic effects.

In an electric motor of the above construction, the equalizing connectors 107 are provided to prevent circulating currents which run through the brushes due to differences in induced voltage between circuits in the winding 103, but one problem is that these equalizing connectors 107 require the securing members 109 for support, increasing the number of parts. Another problem is that space is required to hold the equalizing connectors 107 and the securing members 109, making it difficult to reduce size.

SUMMARY OF THE INVENTION

The present invention aims to solve the above problems and an object of the present invention is to provide a dynamo-electric machine which enables the number of parts to be reduced and can also be reduced in size, etc., and to provide a method of manufacture therefore.

To this end, according to the present invention, there is provided a dynamo-electric machine comprising: a shaft; a core secured to the shaft having slots formed therein extending in the axial direction; a winding composed of a wire or wires wound by a lap winding method through the slots; a commutator having commutator segments being disposed at one end of the core and secured to the shaft; and equalizing connectors electrically connecting the commutator segments which should have the same electric potential; wherein one end portion of each of the equalizing connectors is connected to one of the commutator segments and the other end portion of each of the equalizing connectors passes through the slots and is connected to the other of the commutator segments.

According to another aspect of the present invention, there is provided a method of manufacture for a dynamo-electric machine comprising: a shaft; a core secured to the shaft having slots formed therein extending in the axial direction; a winding composed of a wire or wires wound by a lap winding method through the slots; a commutator having commutator segments being disposed at one end of the core and secured to the shaft; and equalizing connectors electrically connecting the commutator segments which should have the same electric potential; wherein one end portion of each of the equalizing connectors is connected to one of the commutator segments and the other end portion of each of the equalizing connectors passes through the slots and is connected to the other of the commutator segments, the method of manufacture comprising: the step of forming the winding by winding the wire through the slots after connecting a plurality of the equalizing connectors to the commutator segments.

According to another aspect of the present invention, there is provided a method of manufacture for a dynamo-electric machine comprising: a shaft; a core secured to the shaft having slots formed therein extending in the axial direction; a winding composed of a wire or wires wound by a lap winding method through the slots; a commutator having commutator segments being disposed at one end of the core and secured to the shaft; and equalizing connectors electrically connecting the commutator segments which should have the same electric potential; wherein one end portion of each of the equalizing connectors is connected to one of the commutator segments and the other end portion of each of the equalizing connectors passes through the slots and is connected to the other of the commutator segments, the method of manufacture comprising: the step of connecting a plurality of the equalizing connectors to the commutator segments after forming the winding by winding the wire through the slots.

DETAILED DESCRIPTION OF THE PREFERRED EMBODIMENTS

Embodiment 1

Figure 1:
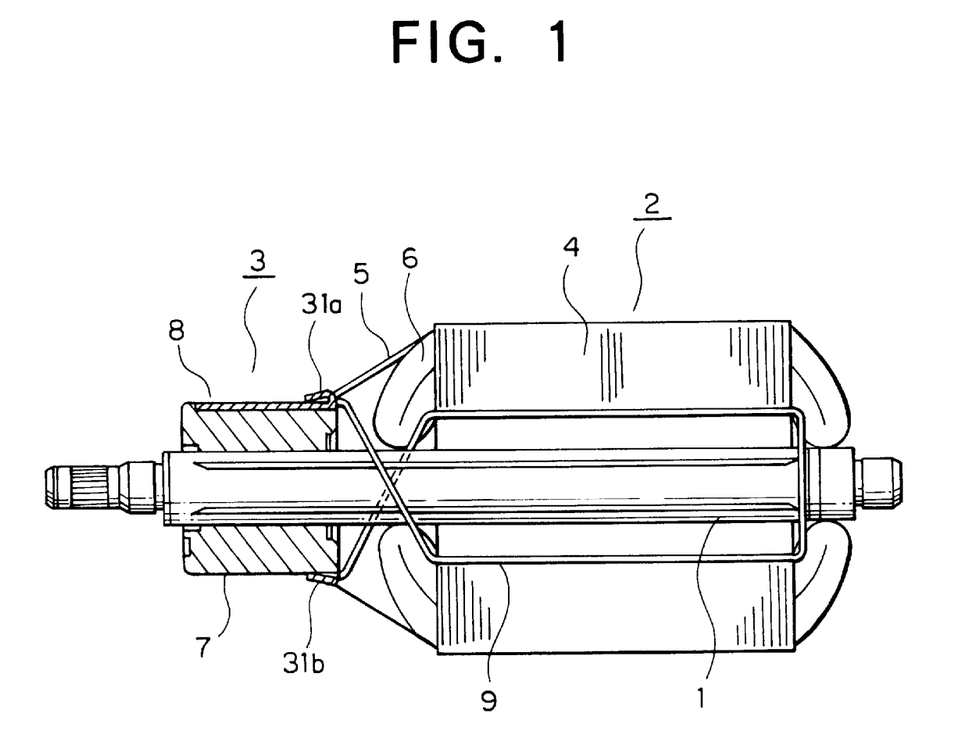
FIG. 1 is a cross-section of an electric motor according to Embodiment 1 of the present invention.
Figure 2:
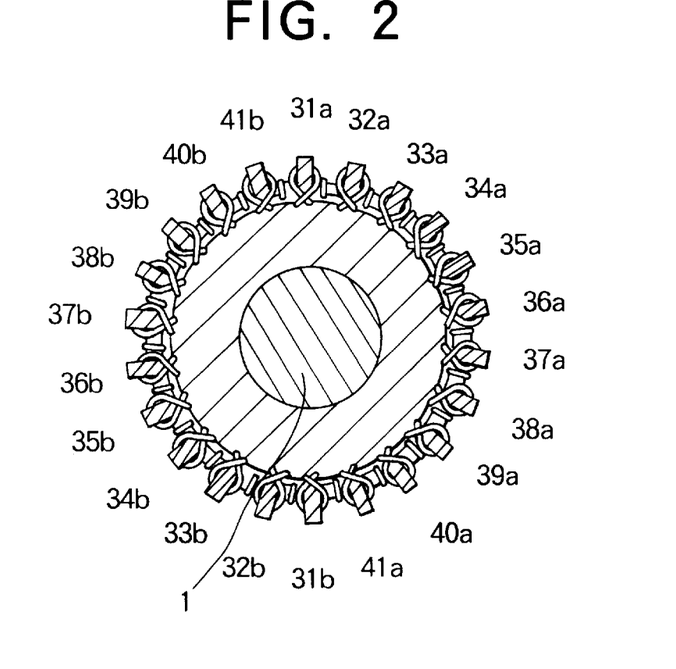
FIG. 2 is a cross-section of the commutator in FIG. 1.
Figure 3:
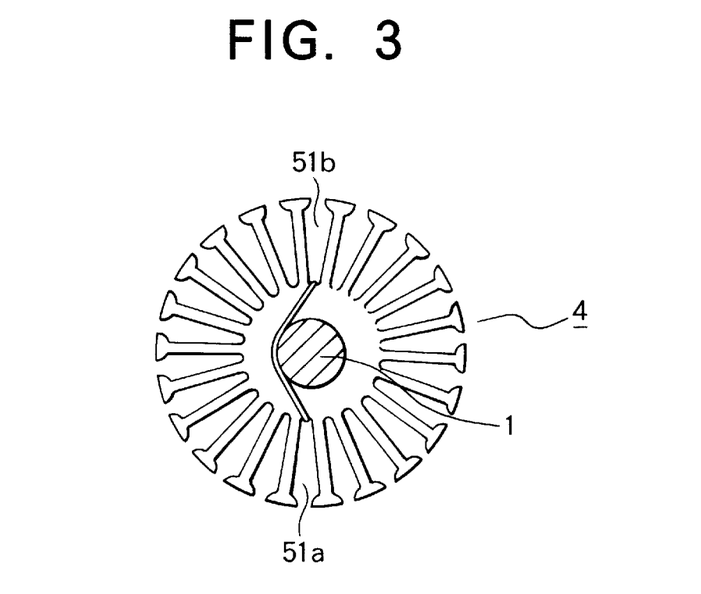
FIG. 3 is a diagram explaining the winding of an equalizing connector in the core in FIG. 1.
Figure 4:
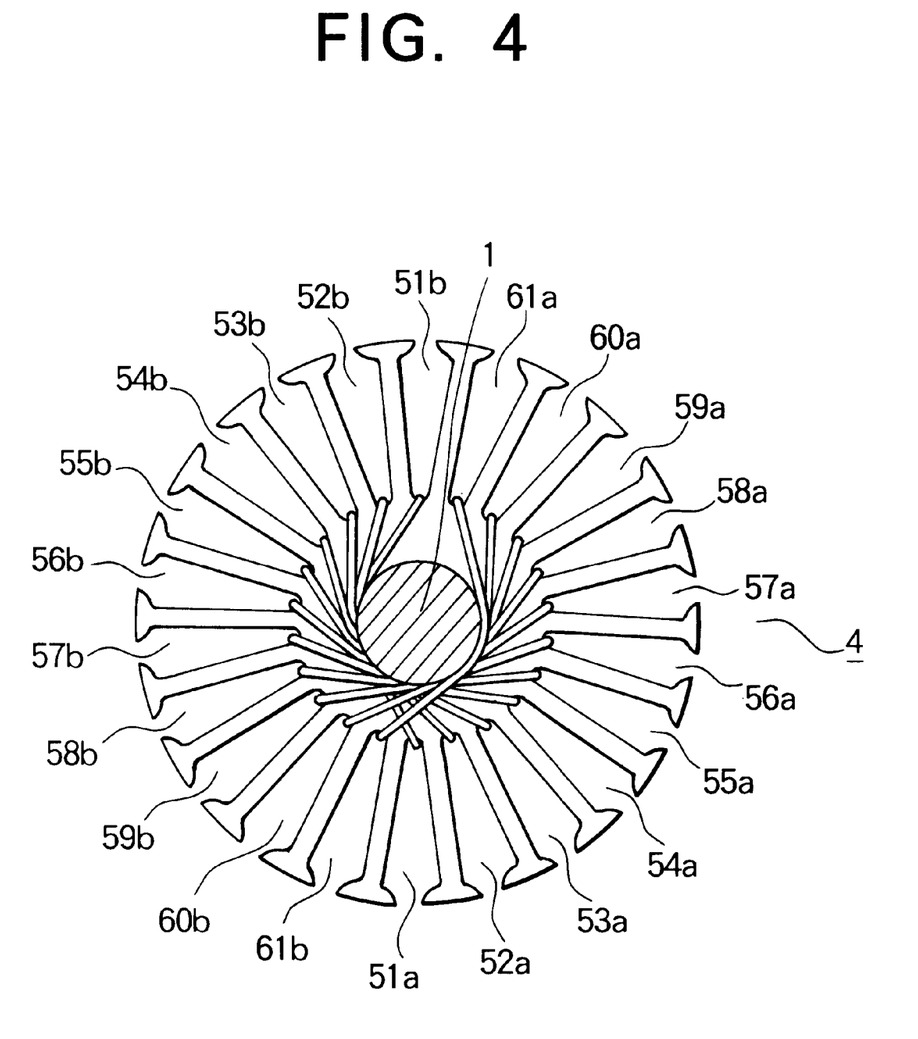
FIG. 4 is a diagram explaining the winding of equalizing connectors in the core in FIG. 1.
Figure 5:
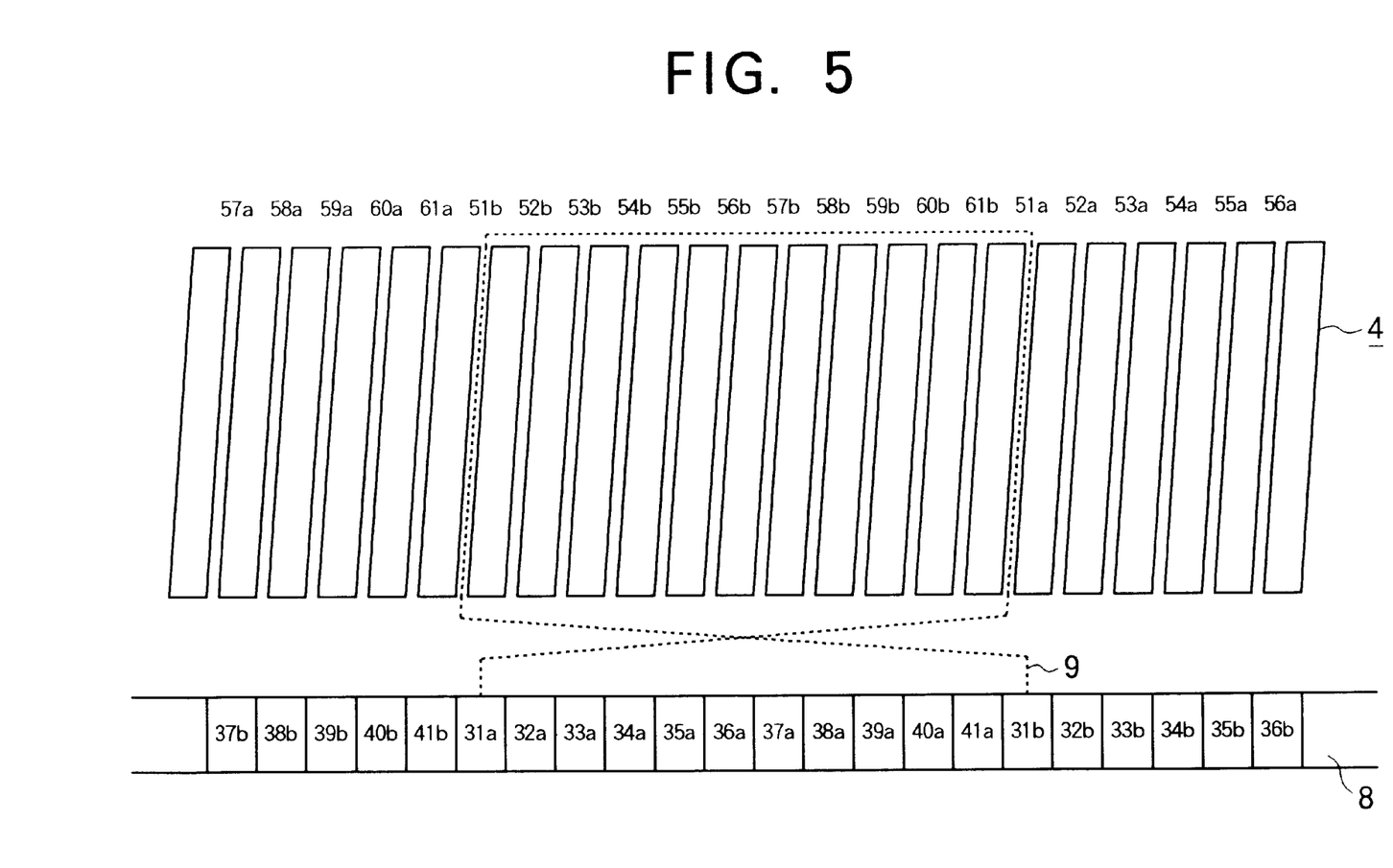
FIG. 5 is a winding diagram for an equalizing connector from FIG. 1.

FIG. 1 is a partial cross-section of an electric motor according to Embodiment 1 of the present invention. The electric motor comprises: a cylindrical yoke (not shown); four permanent magnets (not shown) composed of ferrite secured inside the yoke and spaced circumferentially; a shaft 1 disposed inside the yoke by a bearing so as to be freely rotatable; an armature 2 secured to the shaft 1; and a commutator assembly 3 disposed at one end of the armature 2.

The armature 2 comprises: a core 4 having twenty-two slots extending in the axial direction; and a winding 6 composed of a wire or wires 5 composed of enamel-coated copper wire wound by a lap winding method through the slots.

The commutator assembly 3 comprises: a commutator 7 having commutator segments 8 arranged in the circumferential direction secured to an end portion of the shaft 1; four brushes disposed at equidistant intervals which contact the surface of the commutators 8 by means of the elastic force of springs; and equalizing connectors 9 formed as part of the wire 5 electrically connecting commutator segments 8 which should have the same electric potential.

FIGS. 2 to 5 are diagrams showing equalizing connectors 9 electrically connecting commutator segments 8. The end portion of an equalizing connector 9 engages a hook 31a of a commutator segment 8, the equalizing connector 9 passes through a slot 51a in the core 4 180 degrees opposite the hook 31a and extends to one end of the core 4, then straddles the shaft 1, passes through a slot 51b on the opposite side from slot 51a, extends to the other end of the core 4, and engages a hook 31b of a commutator segment 8 180 degrees opposite the slot 51b. Similarly, an equalizing connector 9 whose end portion engages a hook 32a passes through a slot 52a in the core 4 180 degrees opposite the hook 32a and extends to one end of the core 4, then straddles the shaft 1, passes through a slot 52b on the opposite side from slot 52a, extends to the other end of the core 4, and engages a hook 32b of a commutator segment 8 180 degrees opposite the slot 52b. In the same way, the end portions of the nine other equalizing connectors 9 engage hooks 33a to 41a, the equalizing connectors 9 pass through slots 53a to 61a and slots 53b to 61b, and the other end portions engage hooks 33b to 41b, respectively.

Once the equalizing connectors 9 are physically connected to commutator segments 8 which should have the same electric potential, the wire 5 continues to be wound by a lap winding method into each of the slots 51a to 61a and 51b to 61b in the core 4, and each of the hooks 31a to 41a and 31b to 41b, the equalizing connectors 9, and the wire 5 are electrically connected to each other by fusing, etc.

In the electric motor of this embodiment, each of the equalizing connectors 9 straddles the shaft 1 between each of the hooks 31a to 41a, 31b to 41b and each of the slots 51a to 61a, 51b and 61b, and between the slots 51a to 61a and the slots 51b to 61b, so that the equalizing connectors 9 contact part of the shaft 1 and are reliably positioned. Moreover, the equalizing connectors 9 contact the bottom surface of the narrow-width slots 51a to 61a, 51b and 61b, so that the radial dimensions of the armature 2 are not increased by the provision of the equalizing connectors 9.

Furthermore, the equalizing connectors 9 pass through mutually opposing slots 51a to 61a, 51b to 61b, so that any induced voltages generated in the equalizing connectors 9 mutually cancel out. For that reason, the equalizing connectors 9 can effectively prevent the occurrence of circulating currents due to differences in induced voltage between circuits in the winding 6.

Embodiment 2

Figure 6:
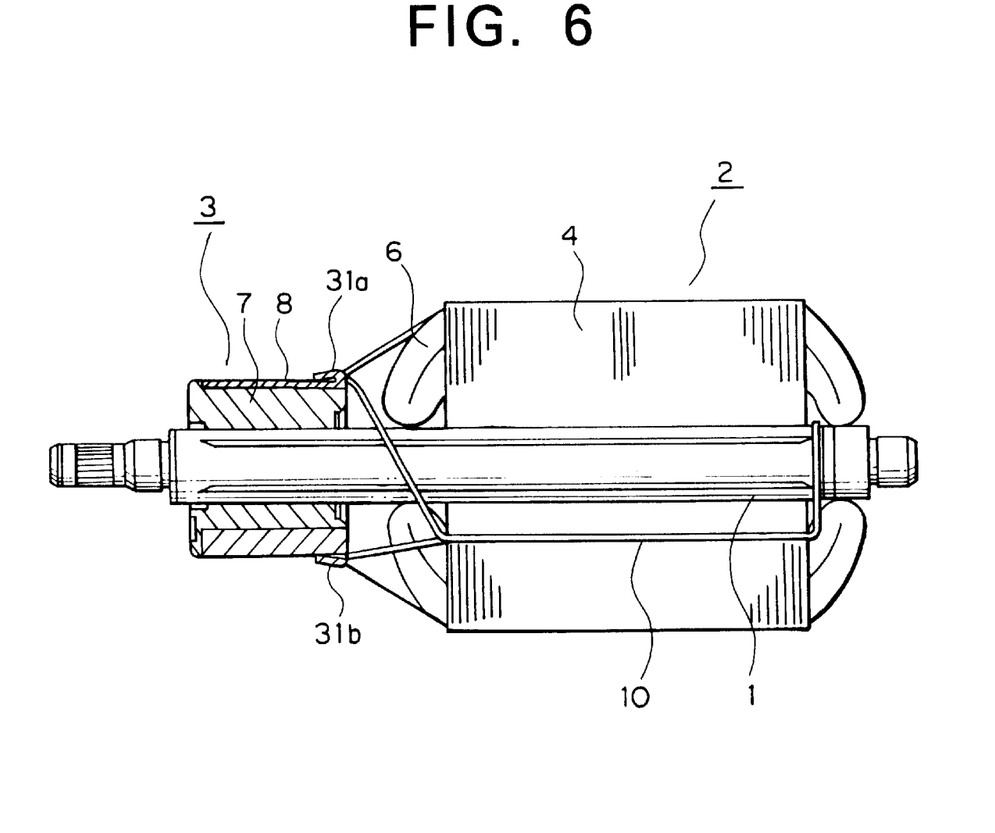
FIG. 6 is a cross-section of an electric motor according to Embodiment 2 of the present invention.
Figure 7:
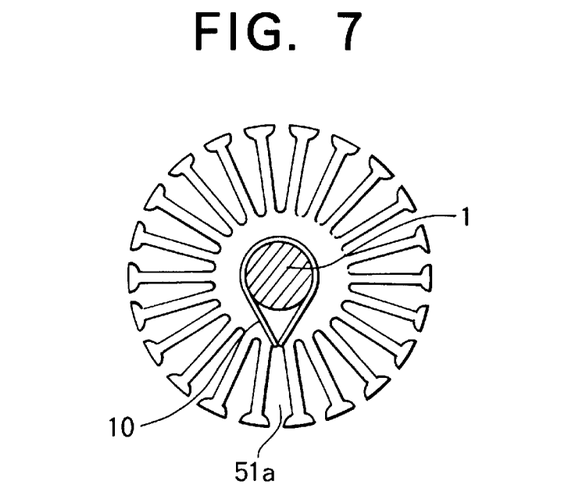
FIG. 7 is a diagram explaining the winding of an equalizing connector in the core in FIG. 6.
Figure 8:
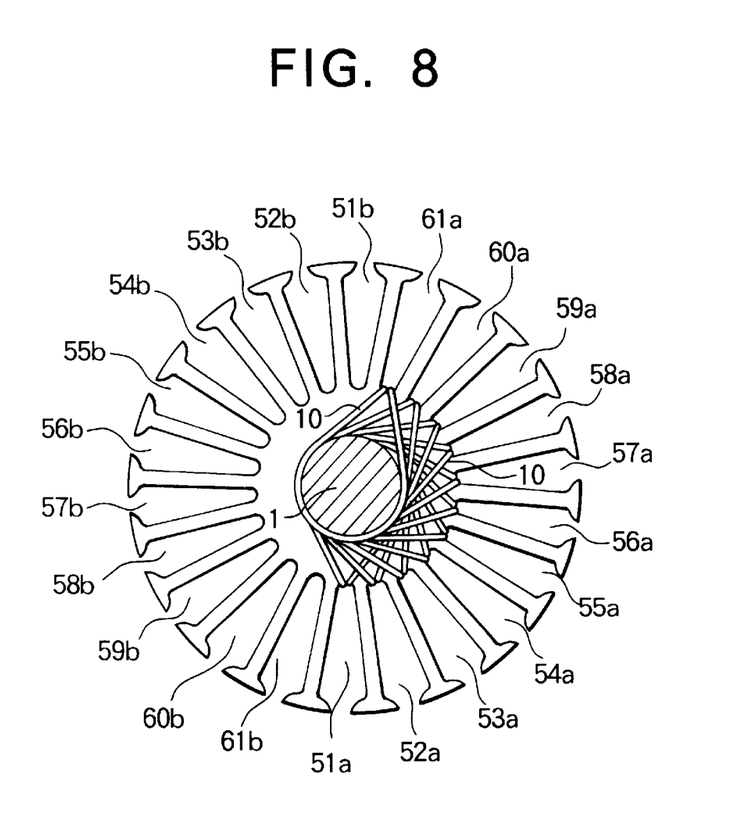
FIG. 8 is a diagram explaining the winding of equalizing connectors in the core in FIG. 6.
Figure 9:
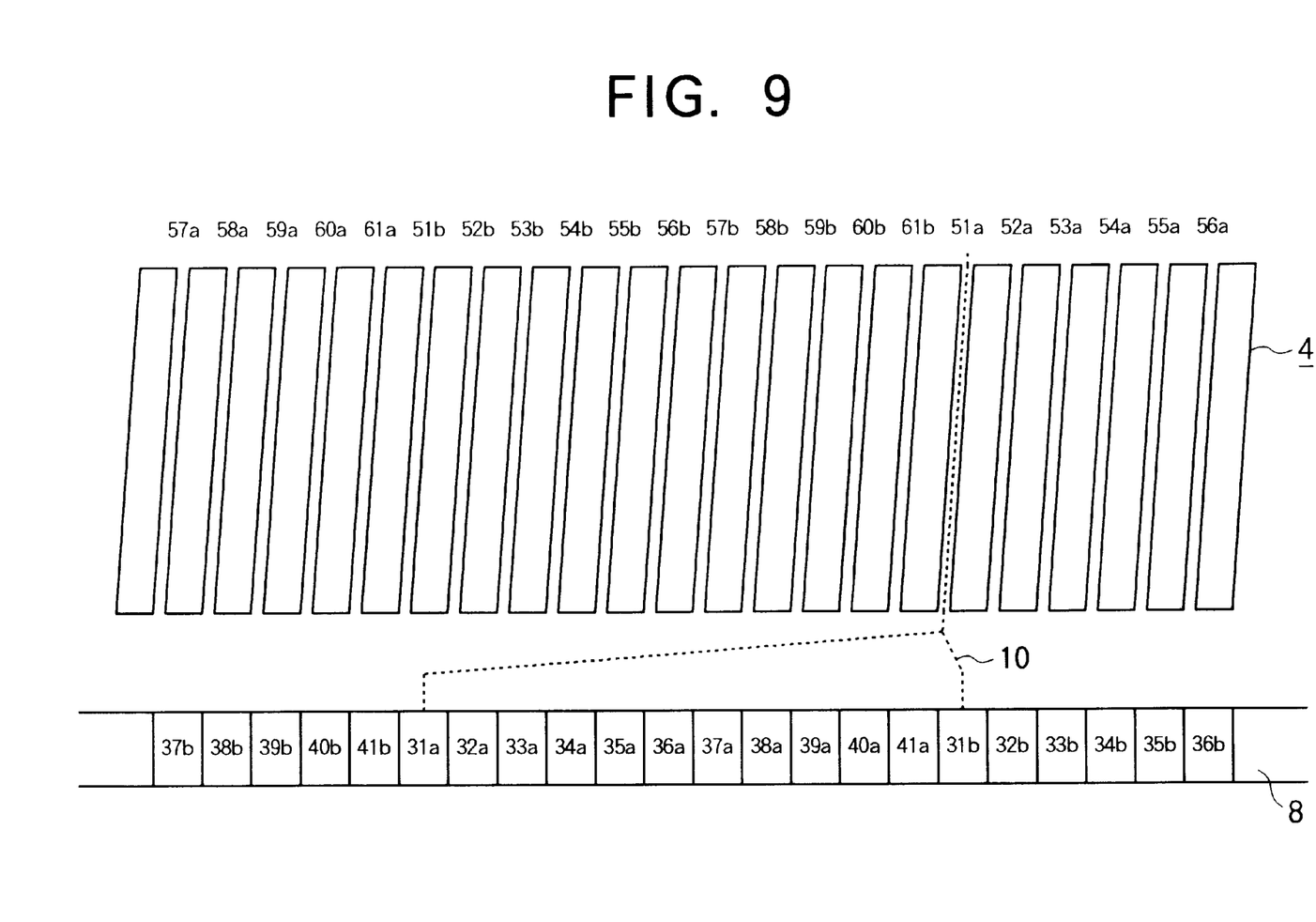
FIG. 9 is a winding diagram for an equalizing connectors from FIG. 6.

FIG. 6 is a partial cross-section of an electric motor according to Embodiment 2 of the present invention. Parts identical to or corresponding to those in Embodiment 1 will be explained using the same numerals.

The end portion of an equalizing connector 10 engages a hook 31a of a commutator segment 8, the equalizing connector 10 passes through a slot 51a in the core 4 180 degrees opposite the hook 31a and extends to one end of the core 4, then winds around the shaft 1, passes through the same slot 51a, extends to the other end of the core 4, and engages a hook 31b opposite the hook 31a from the slot 51a. Similarly, an equalizing connector 10 whose end portion engages a hook 32a passes through a slot 52a in the core 4 180 degrees opposite the hook 32a and extends to one end of the core 4, then winds around the shaft 1, passes through the same slot 52a, extends to the other end of the core 4, and engages a hook 32b opposite the hook 32a from the slot 52a. In the same way, the end portions of the nine other equalizing connectors 10 engage hooks 33a to 41a, the equalizing connectors 10 pass through slots 53a to 61a, and the other end portions engage hooks 33b to 41b, respectively.

Once the equalizing connectors 10 are physically connected to commutator segments 8 which should have the same electric potential, the wire 5 continues to be wound by a lap winding method into each of the slots 51a to 61a and 51b to 61b in the core 4, and then each of the hooks 31a to 41a and 31b to 41b, the equalizing connectors 10, and the wire 5 are electrically connected to each other by fusing, etc.

Moreover, after passing through the slots 51a to 61a, instead of the other end portions of the equalizing connectors 10 directly engaging the hooks 31b to 41b, the equalizing connectors 10 may be wound once around the shaft 1 and then engage the hooks 31b to 41b.

In the electric motor of this embodiment, each of the equalizing connectors 10 straddles the shaft 1 between each of the hooks 31a to 41a and each of the slots 51a to 61a, and passes through one of the slots 51a to 61a, is wound around the shaft, and passes through the same slot 51a to 61a, and engages one of the hooks 31b to 41b, so that the equalizing connectors 10 are wound around the shaft 1 midway and are reliably positioned. Moreover, the equalizing connectors 10 contact the bottom surface of the narrow-width slots 51a to 61a, so that the radial dimensions of the armature 2 are not increased by the provision of the equalizing connectors 10.

Furthermore, the equalizing connectors 10 pass the same slots 51a to 61a on the outward and return paths, so that any induced voltages generated in the equalizing connectors 10 mutually cancel out. For that reason, the equalizing connectors 10 can effectively prevent the occurrence of circulating currents due to differences in induced voltage between circuits in the winding 6.

Embodiment 3

Figure 10:
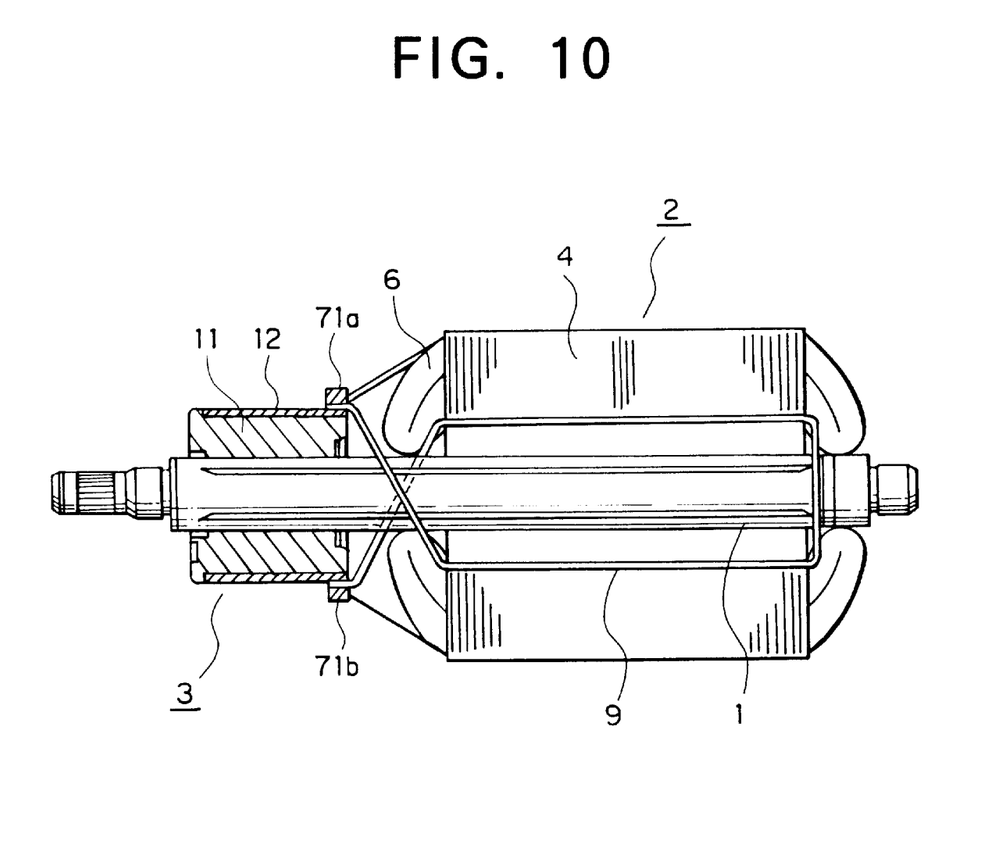
FIG. 10 is a cross-section of an electric motor according to Embodiment 3 of the present invention.
Figure 11:
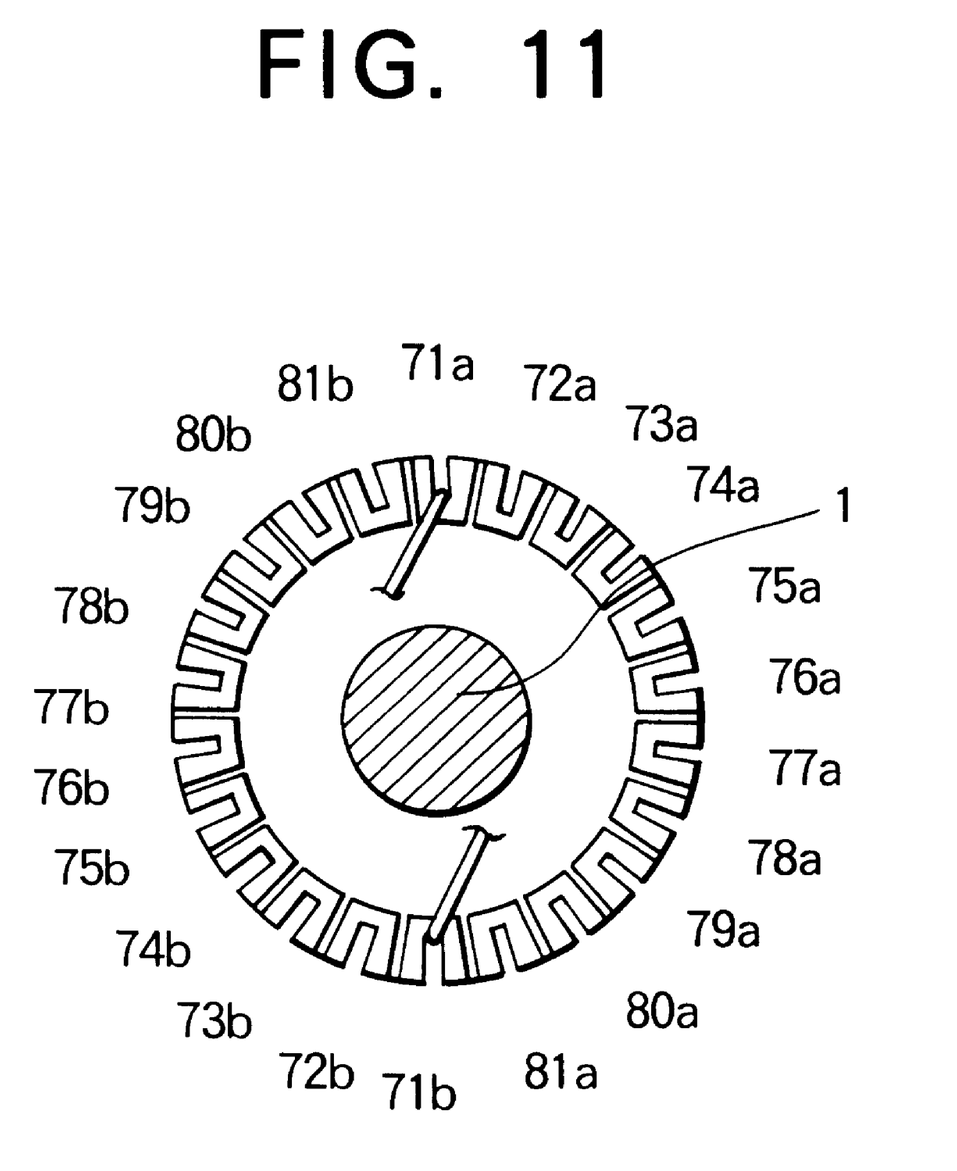
FIG. 11 is a diagram explaining the winding of an equalizing connector on risers from FIG. 10.

FIG. 10 is a partial cross-section of an electric motor according to Embodiment 3 of the present invention, and FIG. 11 is a cross-section of the commutator in FIG. 10. The main difference from Embodiment 1 is that hooks 31a to 41a, 31b to 41b were used in the commutator 7 in the electric motor in Embodiment 1, but risers 71a to 81a, 71b to 81b of concave profile are used in the commutator 11 of this embodiment.

The end portion of an equalizing connector 9 of this embodiment engages a riser 71a of a commutator segment 12, the equalizing connector 9 passes through a slot 51a in the core 4 180 degrees opposite the riser 71a and extends to one end of the core 4, then straddles the shaft 1, passes through a slot 51b on the opposite side from slot 51a, extends to the other end of the core 4, and engages a riser 71b of a commutator segment 12 180 degrees opposite the slot 51b. Similarly, the end portions of the ten other equalizing connectors 9 engage risers 72a to 81a, the equalizing connectors 9 pass through slots 52a to 61a and slots 52b to 61b, and the other end portions engage risers 72b to 81b, respectively.

Embodiment 4

Figure 12:
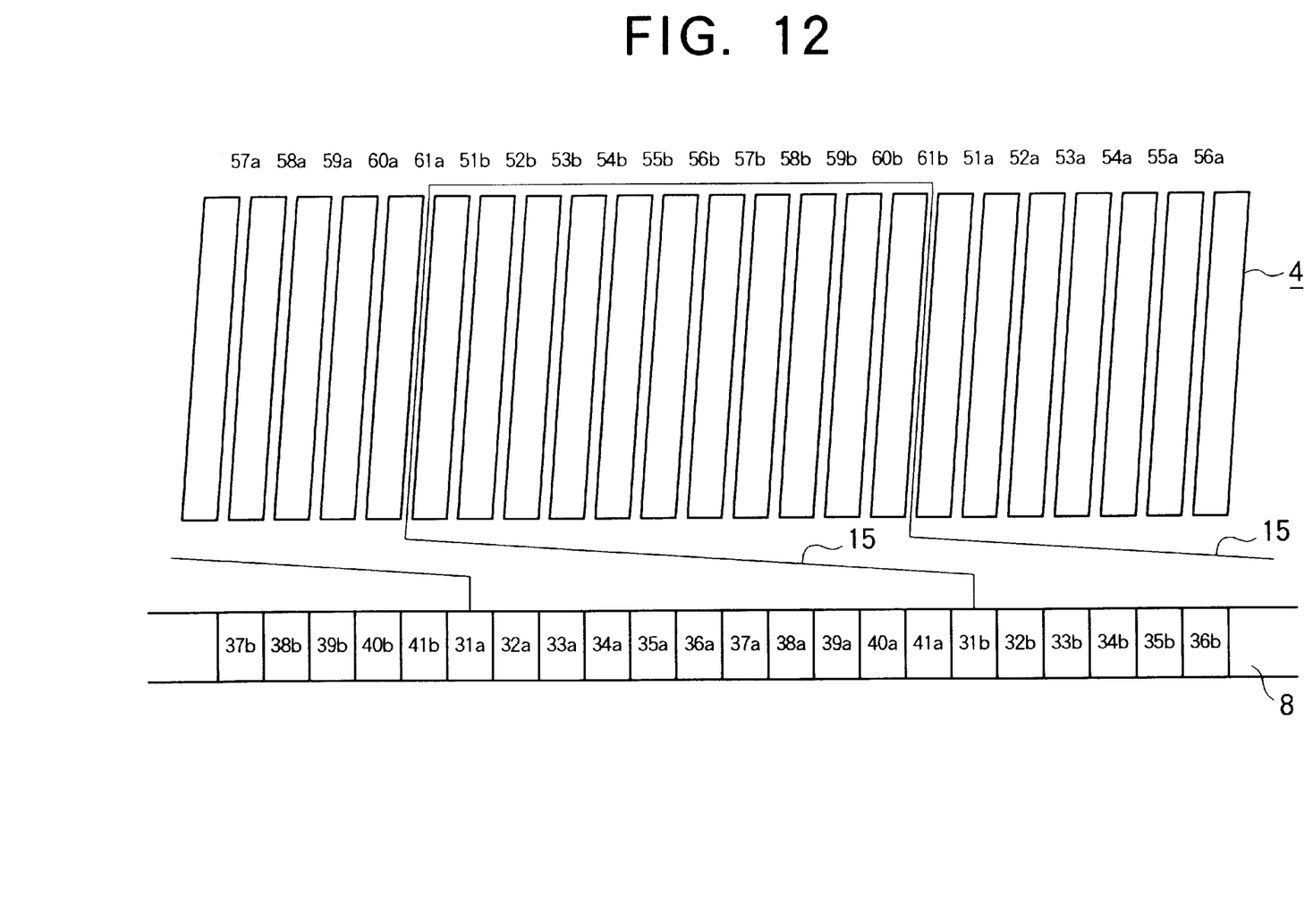
FIG. 12 is a winding diagram for an electric motor according to Embodiment 4 of the present invention.

FIG. 12 is a winding diagram for an equalizing connector in an electric motor according to Embodiment 4 of the present invention. The main difference from the equalizing connectors 9 in Embodiment 1 is that pairs of crossover portions 15 of equalizing connectors 13 between the commutator 7 and the core 4 are disposed parallel to each other.

In this embodiment, the motion of the nozzle of a wiring device relative to the commutator 7 and the core 4 as the equalizing connectors 13 are wound into the slots 51a to 61a, 51b to 61b of the core 4 may be in one direction, enabling the wiring operation and wiring device to be simplified.

Figure 13:
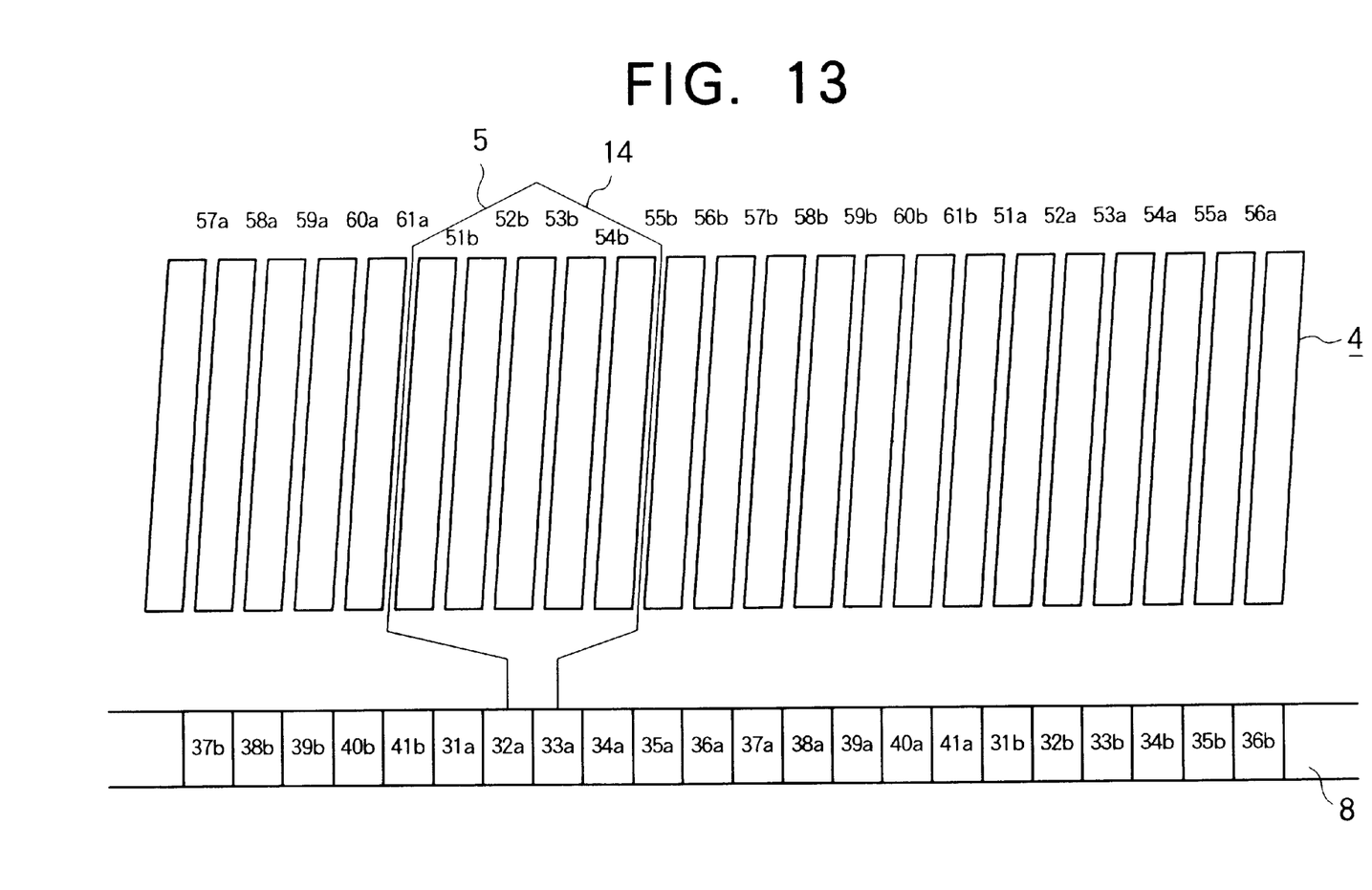
FIG. 13 is a winding diagram for the winding of a so-called "double winding"

Furthermore, the winding 6 in each of the above embodiments is composed of so-called "double winding". That is to say, as shown in FIG. 13, in a 4-pole 22-slot lap wind, the winding 6 is composed of forty-four coil portions 14 formed by winding single coil portions 14, which are formed by winding a wire 5, for example, ten turns, and offsetting each new coil portion one slot at a time until two laps have been made. In the case of double winding, by winding single coil portions 14, which are formed by winding a wire 5 of half the cross-sectional area of a single-wind wire ten turns, and offsetting each new coil portion one slot at a time for forty-four coil portions, or two laps, the resistance is equal to that of a single-wound armature 2, and although the winding time is longer, the wire is finer, improving windability and increasing the wire-to-space ratio of the winding in the slots.

The equalizing connectors 9, 10, 13 in each of the above embodiments have the same diameter as the wire 5 in the winding 6, but the diameter of the wire in the equalizing connectors may be made larger or smaller than the wire in the winding.

The winding is formed by winding the wire into the slots after connecting a plurality of equalizing connectors to the commutator segments, but the plurality of equalizing connectors may be connected to the commutator segments in immediate succession after forming the winding by winding the wire into the slots.

Each of the above embodiments of the present invention has been explained using an electric motor as an example of a dynamo-electric machine, but the present invention can also be applied to a generator. Furthermore, the number of poles may be six, or eight, etc., and the number of slots is not limited to twenty-two. The number of equalizing connectors is not limited to eleven.

As explained above, the dynamo-electric machine according to one aspect of the present invention comprises: a shaft; a core secured to the shaft having slots formed therein extending in the axial direction; a winding composed of a wire or wires wound by a lap winding method through the slots; a commutator having commutator segments being disposed at one end of the core and secured to the shaft; and equalizing connectors electrically connecting the commutator segments which should have the same electric potential; wherein one end portion of each of the equalizing connectors is connected to one of the commutator segments and the other end portion of each of the equalizing connectors passes through the slots and is connected to the other of the commutator segments. Therefore, the equalizing connections are contained within the slots, making members which support the equalizing connections unnecessary and reducing size.

According to one form of the dynamo-electric machine, the equalizing connectors may be disposed such that induced voltages generated in the equalizing connectors mutually cancel out. Therefore, the equalizing connectors can effectively prevent the occurrence of circulating currents due to differences in induced voltage between circuits in the winding.

According to another form of the dynamo-electric machine, each of the equalizing connectors may be wound around the shaft midway and passes through a single slot. Therefore, the equalizing connectors are reliably positioned with respect to the shaft, improving resistance to vibrations as well as mutually and reliably cancelling out induced voltages in the equalizing connectors.

According to still another form of the dynamo-electric machine, each of the equalizing connectors may be wound so as to pass through a pair of opposing slots. Therefore, induced voltages in the equalizing connectors are mutually and reliably cancelled out.

According to one form of the dynamo-electric machine, the equalizing connectors may be disposed so as to straddle the shaft between the commutator and the core. Therefore, the equalizing connectors are reliably positioned with respect to the shaft, improving the resistance of the dynamo-electric machine to vibrations.

According to another form of the dynamo-electric machine, pairs of crossover portions of the equalizing connectors between the commutator and the core may be disposed parallel to each other. Therefore, the motion of the nozzle of a wiring device relative to the commutator and the core as the equalizing connectors are wound into the slots of the core may be in one direction, enabling the wiring operation and wiring device to be simplified.

According to still another form of the dynamo-electric machine, the equalizing connectors may be part of the wire composing the winding. Therefore, the wiring device performs the winding of the equalizing connectors and the wire in the winding in series, enabling simplification of the wiring device.

According to one form of the dynamo-electric machine, the diameter of the equalizing connectors may be different from the diameter of the wire composing the winding. Therefore, when the diameter of the wire in the equalizing connectors is greater than the diameter of the wire in the windings, the physical strength of the equalizing connectors is increased and the equalizing connectors are stronger against breakage due to fusing, etc., and against temperature variations, improving reliability.

According to another form of the dynamo-electric machine, the equalizing connectors may be composed of copper wire with an enamel coat applied to the surface thereof. Therefore, windability is improved and production costs are reduced.

According to still another form of the dynamo-electric machine, the winding may comprise a plurality of coil portions offset by one slot each and wound a plurality of laps circumferentially around the core, each of the coil portions being formed by winding a wire a plurality of turns between a pair of slots separated by a predetermined number of slots.

Therefore, the winding time is longer, but the wire is finer, improving windability and increasing the wire-to-space ratio of the winding in the slots. Also, since the equalizing connectors can be engaged in narrow spaces in the hooks or risers of the commutator segments, for example, freedom to change the shape or reduce the size of the hooks or risers is improved and fusing is facilitated.

According to one aspect of the method of manufacture for a dynamo-electric of the present invention, the method of manufacture comprises the step of forming the winding by winding the wire through the slots after connecting a plurality of the equalizing connectors to the commutator segments. Therefore, since the equalizing connectors are disposed on the bottom surfaces of the slots and the magnetic flux due to the electric current running through the equalizing connectors loops in the bottom portion of the slots, influence thereof on the properties of the dynamo-electric machine can be practically avoided. Also, the length of the equalizing connectors is reduced, making resistance that much smaller and improving the efficiency of the equalizing connectors.

According to another aspect of the method of manufacture for a dynamo-electric of the present invention, the method of manufacture comprises: the step of connecting a plurality of the equalizing connectors to the commutator segments after forming the winding by winding the wire through the slots. Therefore, the equalizing connectors are disposed outside the wire of the winding, so that the commutator segments and the equalizing connectors can be electrically connected by fusing, etc., more reliably.

According to one form of the method of manufacture for a dynamo-electric of the present invention, the method of manufacture may comprise: the step of connecting the equalizing connectors to commutator segments; and the step of forming the winding; the steps being performed in succession. Therefore, since the wire which is inserted into the hooks or risers of the commutator segments can serve as both the equalizing connectors and the wire composing the winding, the amount of wire used in the equalizing connectors and the wire composing the winding can be reduced, facilitating electrical connection by fusing, etc., and improving reliability and productivity.

What is claimed is:

1. A dynamo-electric machine comprising:
   a shaft;
   a core secured to said shaft having slots formed therein extending in the axial direction;
   a winding composed of a wire or wires wound by a lap winding method through said slots;
   a commutator having commutator segments being disposed at one end of said core and secured to said shaft; and
   equalizing connectors electrically connecting said commutator segments which should have the same electric potential;
   wherein one end portion of each of said equalizing connectors is connected to one of said commutator segments and the other end portion of each of said equalizing connectors passes through said slots and is connected to the other of said commutator segments.

2. The dynamo-electric machine according to claim 1, wherein said equalizing connectors are disposed such that induced voltages generated in the equalizing connectors mutually cancel out.

3. The dynamo-electric machine according to claim 2, wherein each of said equalizing connectors is wound around said shaft midway and passes through a single slot.

4. The dynamo-electric machine according to claim 2, wherein each of said equalizing connectors is wound so as to pass through a pair of opposing slots.

5. The dynamo-electric machine according to claim 1, wherein said equalizing connectors are disposed so as to straddle the shaft between said commutator and said core.

6. The dynamo-electric machine according to claim 1, wherein pairs of crossover portions of said equalizing connectors between said commutator and said core are disposed parallel to each other.

7. The dynamo-electric machine according to claim 1, wherein said equalizing connectors are part of said wire composing said winding.

8. The dynamo-electric machine according to claim 1, wherein the diameter of said equalizing connectors is different from the diameter of said wire composing said winding.

9. The dynamo-electric machine according to claim 1, wherein said equalizing connectors are composed of copper wire with an enamel coat applied to the surface thereof.

10. The dynamo-electric machine according to claim 1, wherein said winding comprises a plurality of coil portions offset by one slot each and wound a plurality of laps circumferentially around said core, each of said coil portions being formed by winding a wire a plurality of turns between a pair of slots separated by a predetermined number of slots.

11. A method of manufacture for a dynamo-electric machine comprising:
    a shaft;
    a core secured to said shaft having slots formed therein extending in the axial direction;
    a winding composed of a wire or wires wound by a lap winding method through said slots;
    a commutator having commutator segments being disposed at one end of said core and secured to said shaft; and
    equalizing connectors electrically connecting said commutator segments which should have the same electric potential;
    wherein one end portion of each of said equalizing connectors is connected to one of said commutator segments and the other end portion of each of said equalizing connectors passes through said slots and is connected to the other of said commutator segments,
    said method of manufacture comprising:
    the step of forming said winding by winding said wire through said slots after connecting a plurality of said equalizing connectors to said commutator segments.

12. A method of manufacture for a dynamo-electric machine comprising:
    a shaft;
    a core secured to said shaft having slots formed therein extending in the axial direction;
    a winding composed of a wire or wires wound by a lap winding method through said slots;
    a commutator having commutator segments being disposed at one end of said core and secured to said shaft; and
    equalizing connectors electrically connecting said commutator segments which should have the same electric potential;
    wherein one end portion of each of said equalizing connectors is connected to one of said commutator segments and the other end portion of each of said equalizing connectors passes through said slots and is connected to the other of said commutator segments, said method of manufacture comprising:

the step of connecting a plurality of said equalizing connectors to said commutator segments after forming said winding by winding said wire through said slots.

13. The method of manufacture for a dynamo-electric machine according to claim 11, wherein said equalizing connectors and said wire are formed as one member, said method of manufacture comprising:

the step of connecting said equalizing connectors to commutator segments; and the step of forming the winding;

said steps being performed in succession.

* * * * *